Patented Aug. 6, 1929.

1,723,772

UNITED STATES PATENT OFFICE.

EMIL EDWIN, OF TRONDHJEM, NORWAY.

PROCESS OF MAKING GASEOUS MIXTURES OF NITROGEN AND HYDROGEN.

No Drawing. Application filed March 13, 1925, Serial No. 15,371, and in Norway September 28, 1922.

My invention relates to the direct production of a gaseous mixture of nitrogen and hydrogen containing the said constituents in such proportions as required for using the mixture for producing for instance synthetic ammonia.

The synthetic ammonia process is based on catalytic treatment under high pressure of a mixture of three volumes of hydrogen to one volume of nitrogen. According to my invention I obtain this mixture directly by effecting a complete gasification of carbonaceous material by means of electrically produced energy and by utilizing this energy with very high efficiency for the purpose in view.

In carrying out my invention I start from the previously known process of gas making by introducing carbonaceous material and water into an electric high tension arc according to the reaction.

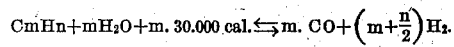

In this equation CmHn may stand for any carbonaceous fuel whatever. The gas produced in this process consists of carbon monoxid and hydrogen eventually with some carbon dioxide and unaltered water vapor. The gases leave the electric high tension arc with a very high temperature of 1300° C. or even more.

On account of this high temperature of the gases this electric gas process is not by itself alone adapted for preparing relatively cold water gas or mixtures of water gas and nitrogen, because in such case the extremely valuable high temperature of the gases is either lost or only imperfectly utilized. It has been proposed (U. S. Patent 1,256,623) to utilize the heat of the gases for the reduction of ores. According to my invention I utilize the heat content of the gases in quite a different way, for carrying out reactions by which gaseous products are formed, which together with the primary constituents of the gas serve for production of the mixture of nitrogen and hydrogen aimed at by the invention.

In detail my process may be varied in several respects. The manner of operation described below is given by way of example and illustrates a modification that may preferably be used.

The gases leaving the high tension arc with a temperature of 1200°-1400° C. or more are introduced into a gas producer using coke or coal, this producer being simultaneously supplied with a suitable quantity of air and a certain amount of water vapor. In the producer the following reactions will then take place:

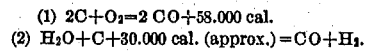

The sensible heat in the gases from the high tension arc will together with the heat produced by the reaction (1) be utilized in the strongly endothermic reaction (2) for producing further quantities of hydrogen and carbon monoxid. By proper regulation of the supply of air and steam to the producer it is possible to obtain from the latter a gas of a temperature not exceeding 700-800° C. and consisting to the main part of carbon monoxid, hydrogen and nitrogen in the approximate proportion of three volumes of carbon monoxid and hydrogen to one volume of nitrogen.

Besides the said three components the gas will of course contain steam and some carbon dioxid.

The sensible heat in the gases leaving the high tension arc is reduced in the producer to a temperature of 700-800° C.

The heat still remaining in the gas may be utilized for the production of steam to be supplied to the gases. This supply of steam may conveniently be carried out in the manner that atomized water is introduced into the gases and is vaporized by the high temperature of the latter. In this way a gas is obtained which according to prevailing conditions may contain from 30 to 60 per cent of water vapor. This gas is introduced into a catalytic apparatus in order to make the carbon monoxid react with the water vapor according to the equation

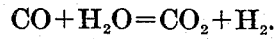

From the resulting gas the carbon dioxid is removed, and a gas mixture consisting of three volumes of hydrogen to one volume of nitrogen is obtained. Previous to the catalytic treatment a portion of the mixture of steam and gas is preferably withdrawn and returned to the high tension arc.

This circulation of a portion of the produced gases is in many cases of considerable importance in order to increase the gas volume acting as carrier of the sensible heat, which is utilized for the secondary gas producing reactions of the process.

If the high tension arc is used exclusively for the endothermic reactions of producing carbon monoxid and hydrogen from carbonaceous material and water vapor, it may be difficult to force such a quantity of electric energy upon the arc that the gases produced are heated to the necessary temperature to carry sufficient sensible heat for realizing the secondary reactions. And likewise it is difficult to obtain a high tension arc of sufficient stability under such conditions. When a certain portion of the produced gases is circulated through the system, the increased volume of gas passing the arc improves the working conditions of the latter, in that, part of the energy of the arc is utilized for heating the gas and only the rest of the energy serves for the endothermic reactions of gas production.

I claim:

1. The process of making a gaseous mixture of nitrogen and hydrogen in such proportions as are required for instance for the production of synthetic ammonia, which comprises subjecting carbonaceous combustible material and water vapor to the action of an electric high tension arc to produce a hot gas consisting mainly of carbon monoxid and hydrogen with some nitrogen and carbon dioxid, directly utilizing the sensible heat of said gas for carrying out gas producing reactions with and in said gas, by which gaseous products are formed which together with the primary constituents of the gas serve for the production of the mixture of nitrogen and hydrogen, and purifying the gas mixture so obtained.

2. The process of making a gaseous mixture of nitrogen and hydrogen, which comprises subjecting carbonaceous combustible material and water vapor to the action of an electric high tension arc to produce a hot gas consisting mainly of carbon monoxid and hydrogen, immediately utilizing the sensible heat of said gas for carrying out gas producing reactions with and in the gas by means of water vapor a gas containing nitrogen and carbonaceous material and purifying the gas mixture.

3. The process of making a gaseous mixture of nitrogen and hydrogen, which comprises subjecting carbonaceous combustible material and water vapor to the action of an electric high tension arc to produce a hot gas consisting mainly of carbon monoxid and hydrogen, immediately utilizing the sensible heat of said gas for carrying out gas producing reactions with and in the gas by means of water vapor, air and carbonaceous material and purifying the gas mixture.

4. The process of making a gaseous mixture of nitrogen and hydrogen, which comprises subjecting carbonaceous combustible material and water vapor to the action of an electric high tension arc to produce a hot gas consisting essentially of carbon monoxid and hydrogen introducing this gas directly into a producer, which is simultaneously supplied with air and water vapor, subjecting the gas leaving the producer to the action of a catalyzer to convert water vapor and carbon monoxid into hydrogen and carbon dioxid and removing the carbon dioxid and other impurities from the mixture.

5. The process of making a gaseous mixture of nitrogen and hydrogen, which comprises subjecting carbonaceous combustible material and water vapor to the action of an electric high tension arc to produce a hot gas consisting essentially of carbon monoxid and hydrogen, introducing this gas directly into a producer, supplying air and water vapor to said producer, adding water vapor or atomized water to the gas leaving the producer, subjecting the mixture so obtained to the action of a catalyzer to convert carbon monoxid and water vapor into hydrogen and carbon dioxid and removing the carbon dioxid and other impurities from the mixture.

6. The process of making a gas consisting of nitrogen and hydrogen in proper proportions for the production of for instance synthetic ammonia, which comprises subjecting carbonaceous combustible material and water vapor to the action of an electric high tension arc to produce a gas consisting essentially of carbon monoxid and hydrogen, introducing this gas into a hot gas producer, which is supplied with air and water vapor, adding moisture to the gas directly leaving the producer, returning a portion of this moist gas to the high tension arc, subjecting the rest of the moist gas to catalytic action to convert carbon monoxid and water vapor into hydrogen and carbon dioxid, removing the carbon dioxid and purifying the gas.

In testimony that I claim as my invention I have signed my name.

EMIL EDWIN.